(12) United States Patent
    Zhou

(10) Patent No.: US 11,281,879 B2
(45) Date of Patent: Mar. 22, 2022

(54) FINGERPRINT IDENTIFICATION SENSING MODULE AND DISPLAY PANEL USING THE SAME

(71) Applicant: WUHAN CHINA STAR OPTOELECTRONICS TECHNOLOGY CO., LTD., Hubei (CN)

(72) Inventor: Yongxiang Zhou, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 482 days.

(21) Appl. No.: 16/335,261

(22) PCT Filed: Mar. 14, 2019

(86) PCT No.: PCT/CN2019/078145
§ 371 (c)(1),
(2) Date: Mar. 21, 2019

(87) PCT Pub. No.: WO2020/133719
PCT Pub. Date: Jul. 2, 2020

(65) Prior Publication Data
US 2021/0350098 A1    Nov. 11, 2021

(30) Foreign Application Priority Data
Dec. 29, 2018  (CN) .......................... 201811638172.6

(51) Int. Cl.
*G06F 3/043*    (2006.01)
*G06K 9/00*     (2022.01)
*G06F 3/044*    (2006.01)
*G06F 3/041*    (2006.01)
*G06F 3/045*    (2006.01)

(52) U.S. Cl.
CPC .......... *G06K 9/0002* (2013.01); *G06F 3/043* (2013.01); *G06F 3/045* (2013.01); *G06F 3/0412* (2013.01); *G06F 3/0445* (2019.05); *G06F 2203/04103* (2013.01)

(58) Field of Classification Search
None
See application file for complete search history.

(56) References Cited

U.S. PATENT DOCUMENTS

2011/0215150 A1    9/2011  Schneider
2019/0205595 A1*   7/2019  Gong ................... G06F 1/1696
2019/0294845 A1*   9/2019  De Foras ............. G06K 9/0002

FOREIGN PATENT DOCUMENTS

CN    107145858 A    9/2017
CN    108734051 A    11/2018

* cited by examiner

*Primary Examiner* — Brian M Butcher
(74) *Attorney, Agent, or Firm* — Soroker Agmon Nordman

(57) ABSTRACT

A fingerprint identification sensing module includes a first electrode and a second electrode, a piezoelectric material layer interposed between the first electrode and the second electrode, and a damping layer, arranged on a surface of the first electrode. The first electrode and the second electrode are arranged opposite.

6 Claims, 2 Drawing Sheets

FINGERPRINT IDENTIFICATION SENSING MODULE AND DISPLAY PANEL USING THE SAME

BACKGROUND

1. Field of the Disclosure

The present disclosure relates to the technology of a display panel, and more particularly, to a fingerprint identification sensing module and a display panel using the same.

2. Description of the Related Art

Once an electronic product adopts ultrasonic fingerprint recognition technology, there is no worry about interference of water and oil. Besides, the electronic product has a stronger ability to adapt to the environment and can be applied to a more complex environment. So the ultrasonic fingerprint recognition of the related art gradually gets widespread attention and is increasingly used in various fields. For example, the ultrasonic fingerprint recognition of the related art enhances the security of electronic products such as cellphones, computers, tablet, and access control systems.

Compared with the traditional digital password, fast unlocking with a fingerprint brings a lot convenience to a person's daily life. However, the performance of the current ultrasonic fingerprint sensor is not satisfactory.

As for the ultrasonic fingerprint recognition technology of the related art, a voltage is imposed on a piezoelectric thin film layer (or a piezoelectric material layer) to force the piezoelectric thin film layer to emit high-frequency vibration to generate an ultrasonic wave. Subsequently, the ultrasonic wave is reflected by a user's finger to the piezoelectric thin film layer and converted into an electrical signal for identification by the piezoelectric thin film layer. Due to the different intensity of the ultrasonic signal reflected by the user's finger's ridges and valleys, the electrical signal obtained after being converted by the piezoelectric thin film layer is different, and thus the pattern of the fingerprint can be achieved.

However, the ultrasonic pulse wave circulates a lot and the pulse echo will increase the number of the reflected ultrasonic wave, so superposition between the different signals makes it difficult to distinguish between the ultrasonic echoes when the interval between different pulses is small, which increases the difficulty in recognizing different longitudinal pulses of the ultrasonic wave and increases the difficulty of the fingerprint analysis and identification in the later stage.

Therefore, it is necessary to propose a new fingerprint identification sensor to improve the longitudinal resolution.

SUMMARY

The purpose of the present disclosure is to provide a fingerprint identification sensing module where a damping layer is arranged. The damping layer absorbs energy from the piezoelectric material layer, thereby reducing the number of cycles of the pulse wave.

According to a first aspect of the present disclosure, a fingerprint identification sensing module includes: a first electrode and a second electrode; the first electrode and the second electrode being arranged opposite; a piezoelectric material layer, interposed between the first electrode and the second electrode; a damping layer, arranged on a surface of the first electrode; and a supporting layer. The first electrode is arranged on the supporting layer and supported by the supporting layer. The supporting layer comprises a resonant cavity. The first electrode in the resonant cavity is not supported by the supporting layer. The damping layer is arranged on the surface of the first electrode facing the piezoelectric material layer so that the damping layer is interposed between the first electrode and the piezoelectric material layer, or the damping layer is arranged on the surface of the first electrode away from the piezoelectric material layer.

According to one embodiment of the present disclosure, a material for the damping layer is any one of butyl rubber, acrylate rubber, nitrile rubber, silicone rubber, nitrile rubber and silicone rubber blends, polyurethane, polyvinyl chloride, and epoxy resin.

According to a second aspect of the present disclosure, a fingerprint identification sensing module includes: a first electrode and a second electrode; the first electrode and the second electrode being arranged opposite, a piezoelectric material layer, interposed between the first electrode and the second electrode; and a damping layer, arranged on a surface of the first electrode.

According to one embodiment of the present disclosure, the damping layer is arranged on the surface of the first electrode facing the piezoelectric material layer so that the damping layer is interposed between the first electrode and the piezoelectric material layer.

According to one embodiment of the present disclosure, the damping layer is arranged on the surface of the first electrode away from the piezoelectric material layer.

According to one embodiment of the present disclosure, the fingerprint identification sensing module further comprises a supporting layer; the first electrode is arranged on the supporting layer and supported by the supporting layer; the supporting layer comprises a resonant cavity; the first electrode in the resonant cavity is not supported by the supporting layer.

According to one embodiment of the present disclosure, a material for the damping layer is any one of butyl rubber, acrylate rubber, nitrile rubber, silicone rubber, nitrile rubber and silicone rubber blends, polyurethane, polyvinyl chloride, and epoxy resin.

According to one embodiment of the present disclosure, the piezoelectric material layer is any one of aluminum nitride (AlN), lead zirconate titanate (PZT), polyvinylidene fluoride (PVDF), and polyvinylidene fluoride-trifluoroethylene copolymer (P(VDF-TrFE)).

According to a first aspect of the present disclosure, a display panel includes: a first substrate; and a fingerprint identification sensing module as claimed by claim 1 wherein the fingerprint identification sensing module is arranged on the first substrate.

According to one embodiment of the present disclosure, a damping layer is arranged: (a) on a surface of a first electrode facing a piezoelectric material layer so that the damping layer is interposed between the first electrode and the piezoelectric material layer, or (b) on a surface of a first electrode away from the piezoelectric material layer.

According to one embodiment of the present disclosure, the first substrate comprises a display area and a non-display area; the fingerprint identification sensing module is arranged in the non-display area of the first substrate or the display area of the first substrate.

According to one embodiment of the present disclosure, the display panel further comprises: a display element layer, arranged on the first substrate and covering the fingerprint identification sensing module; and a second substrate, arranged on the display element layer, so that the second substrate and the first substrate form the display panel.

According to one embodiment of the present disclosure, the display panel further comprises a touch-control layer; the touch-control layer is arranged on a surface of the second substrate.

According to one embodiment of the present disclosure, the touch-control layer is arranged on the surface of the second substrate facing the display element layer so that the touch-control layer is interposed between the display element layer and the second substrate.

According to one embodiment of the present disclosure, the touch-control layer is arranged on the surface of the second substrate away from the display element layer.

In the present disclosure, a damping layer is adopted to absorb the energy of the piezoelectric material layer, thereby reducing the number of cycles of the pulse wave. In addition, the damping layer absorbs the energy of the vibrating piezoelectric material layer hardly obviously at the beginning, but with the process of vibration, the effect of absorbing the energy more and more obviously. Therefore, the impact of the first occurrence of a pulse wave of the piezoelectric material layer is not large, and there is no significant impact on the signal to noise ratio. The damping layer can significantly absorb the energy pulse wave at the later stage, thereby increasing the longitudinal resolution of the ultrasonic fingerprint identification. Thus, the fingerprint identification sensing module introduced in the present disclosure can significantly reduce the difficulty in subsequent analysis and identification valleys and ridges of the ultrasonic fingerprint and simplify the corresponding algorithm, thereby further improving the recognition speed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Figure 1A:
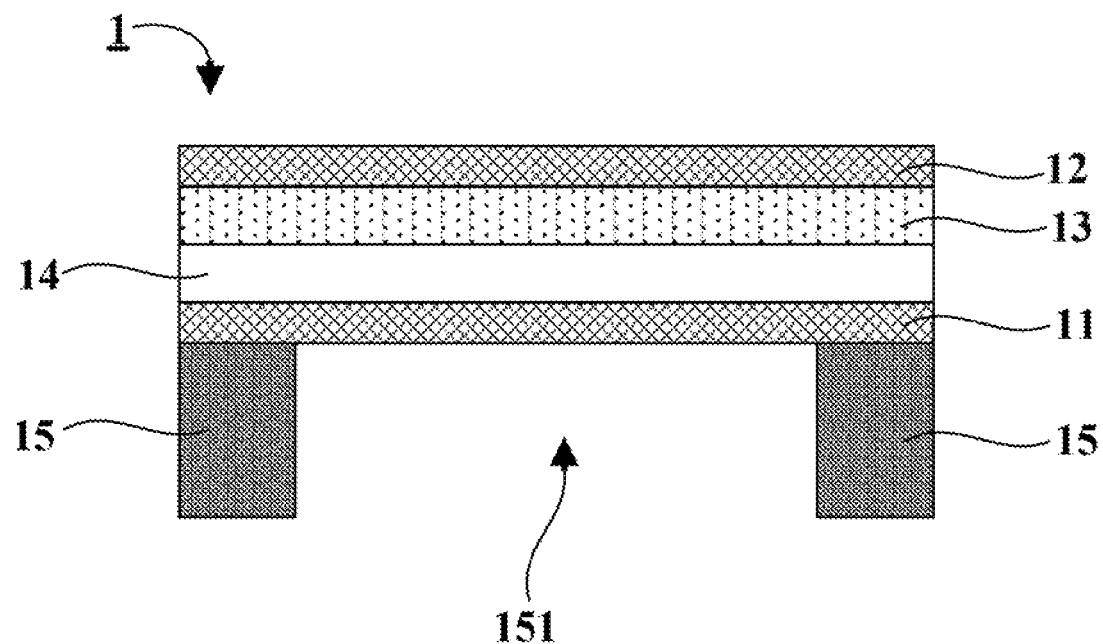
FIG. 1A and FIG. 1B illustrate schematic diagrams of a fingerprint identification sensing module according to one embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure herein provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

Figure 1B:
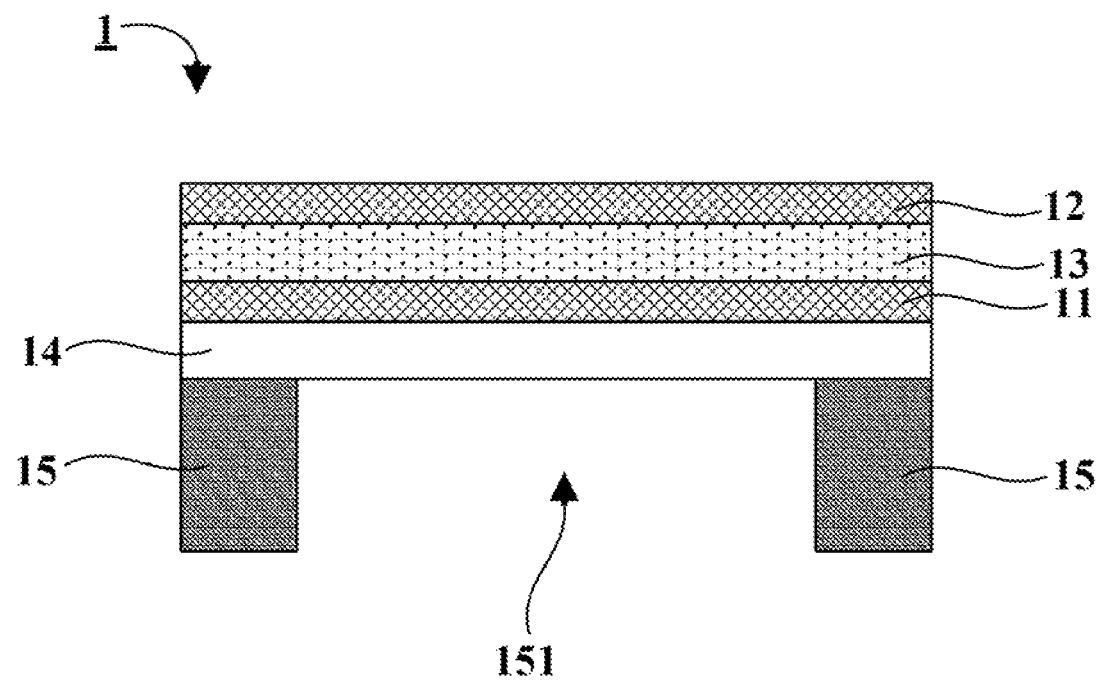
Figure 2:
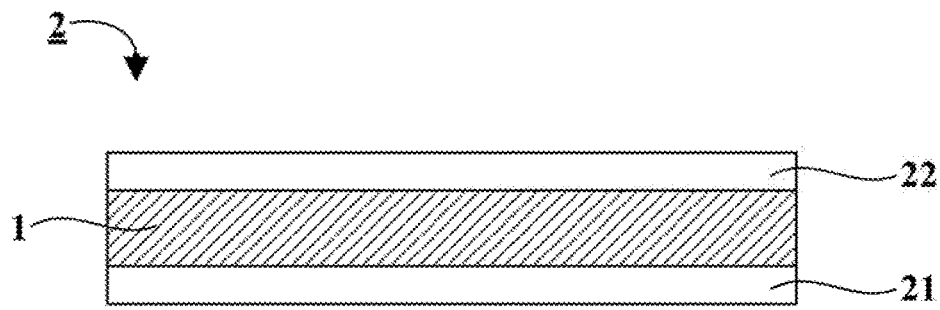
FIG. 2 illustrates a fingerprint identification sensor according to one embodiment of the present disclosure.
Figure 3:
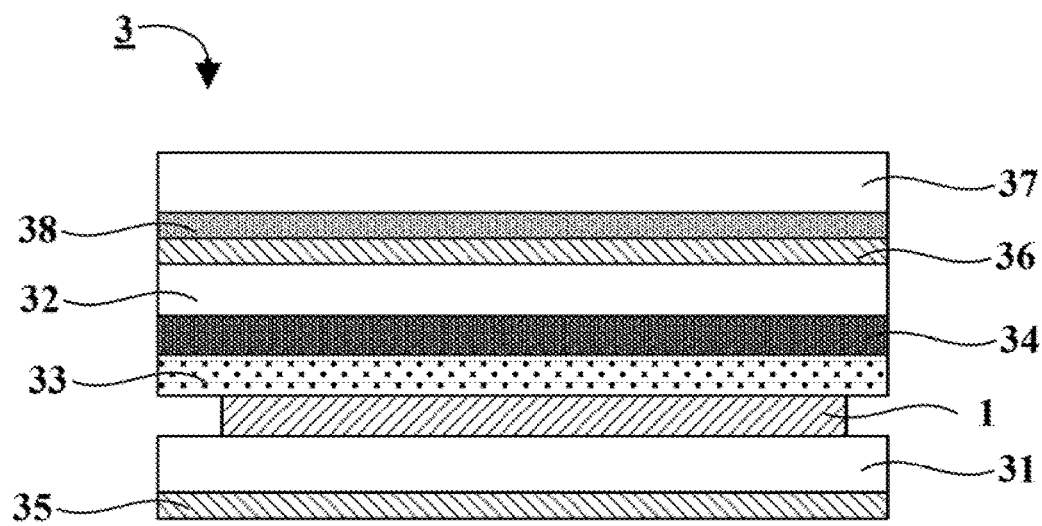
FIG. 3 illustrates a schematic diagram of a display panel according to one embodiment of the present disclosure.
Figure 4:
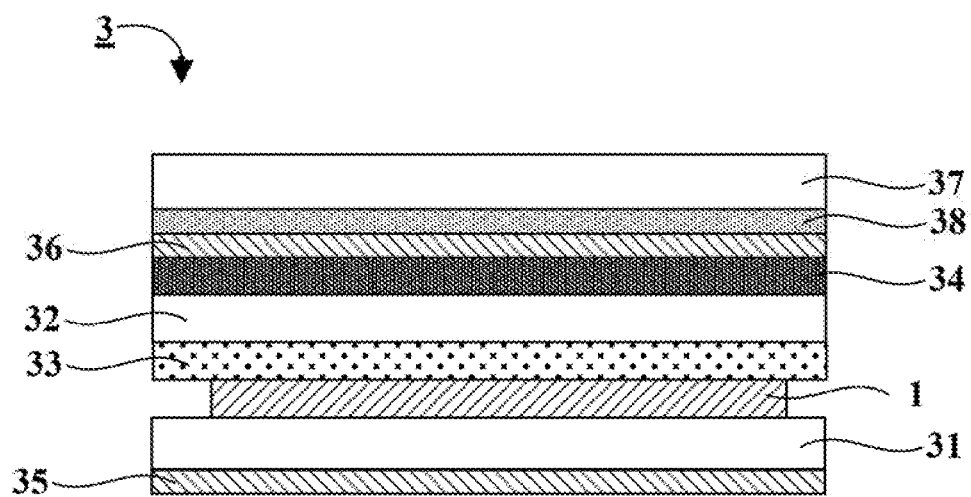
FIG. 4 illustrates a schematic diagram of a display panel according to another embodiment of the present disclosure.

As FIG. 1A and FIG. 1B illustrate, a fingerprint identification sensing module 1 may be a fingerprint identification sensor as illustrated in FIG. 2 or may be integrated in the structure of a display panel as illustrated in FIG. 3 and FIG. 4.

The fingerprint identification sensing module 1 includes a first electrode 11, a second electrode 12, a piezoelectric material layer 13, a damping layer 14, and a supporting layer 15. The first electrode 11 and the second electrode 12 are arranged opposite. The piezoelectric material layer 13 is interposed between the first electrode 11 and second electrode 12.

In another embodiment, as illustrated in FIG. 1A, a damping layer 14 is arranged on a surface of a first electrode 11 facing a piezoelectric material layer 13 so that the damping layer 14 can be interposed between the first electrode 11 and the piezoelectric material layer 13. The supporting layer 15 is arranged on the surface of the first electrode 11 away from the damping layer 14 and configured to support the first electrode 11 and the damping layer 14, the piezoelectric material layer 13, and a second electrode 12, which are all arranged on the first electrode 11.

In another embodiment, as illustrated in FIG. 1B, a damping layer 14 is arranged on a surface of a first electrode 11 away from a piezoelectric material layer 13. The supporting layer 15 is arranged on the surface of the first electrode 11 away from the damping layer 14 and configured to support the damping layer 14 and the first electrode 11, the piezoelectric material layer 13, and a second electrode 12, which are all arranged on the damping layer 14.

The supporting layer 15 includes a resonant cavity 151. The first electrode 11 (FIG. 1A) on the supporting layer 15 and/or the damping layer 14 (FIG. 1B) in the resonant cavity 151 are/is not supported by the supporting layer 15. Those skilled in the art will be appreciated that the resonant cavity 15 is configured to enhance the amplitude of the piezoelectric material layer 13.

The material for the damping layer 14 may be butyl rubber, acrylate rubber, nitrile rubber, silicone rubber, nitrile rubber and silicone rubber blends, polyurethane, polyvinyl chloride, and epoxy resin, or a mixture of some of the materials. Those skilled in the an will be appreciated that the material of the damping layer 14 may be any suitable damping material known in the art with a good damping effect and in the range of −50° C. to 200° C.

In addition, the first electrode 11 and second electrode 12 may be any suitable electrode material known in the art such as Ag, Al, Mo, Au, Cr, Ni, Cu, and Pt, or an alloy of some of these metals. However, it is not limited to Ag, Al, Mo, Au, Cr, Ni, Cu, and Pt.

The piezoelectric material layer 13 may be any suitable piezoelectric material known in the art such as aluminum nitride (AlN), lead zirconate titanate (PZT), polyvinylidene fluoride (PVDF), and polyvinylidene fluoride-trifluoroethylene copolymer (P(VDF-TrFE)). However, it is not limited to the above AlN, PZT, and P(VDF-TrFE).

The insulating layer 15 may be made of any suitable insulating material known in the art such as silicon dioxide (SiO2). However, it is not limited to SiO2.

The fingerprint identification sensing module 1 may be a fingerprint identification sensor as illustrated in FIG. 2. For clarity purposes, the fingerprint identification sensing module 1 is one layer in FIG. 2. Those skilled in the art will be appreciated that the fingerprint identification sensing module 1 illustrated in FIG. 2 includes a complete structure as illustrated in FIG. 1A and FIG. 1B.

As FIG. 2 illustrates, the fingerprint sensor 2 includes a circuit board 21, a fingerprint identification sensing module 1 arranged on the circuit board 21, and a protective layer 22. The circuit board 21 may be connected to the fingerprint identification sensing module 1 through a suitable bonding layer (not illustrated). The circuit board 21 may be a thin film transistor array substrate which includes a drive line and a detection line. In the emitting stage of the ultrasonic wave, the driving line continuously applies an alternating current (AC) emitting voltage at a high frequency to one or more of the first electrode 11 and the second electrode 12 of the fingerprint identification sensing module 1 as illustrated in FIG. 1A and FIG. 1B so that the piezoelectric material layer 13 can generate the ultrasonic wave and is amplified by a resonant cavity 151. The damping layer 14 significantly absorbs mechanical energy so that the ultrasonic cycles are significantly reduced. In the receiving stage of the ultrasound, the driving line is switched to the detection line. Due to the different amplitude of the ultrasonic waves reflected by the valleys and ridges of the fingers, the echo effect feedback to the second electrode 12 produces different piezoelectric effects on the piezoelectric material layer 13, and then produce different voltage signals on the first electrode 11. The voltage signal is configured to identify fingerprints.

The fingerprint identification sensing module 1 may be applied to the display panel, as illustrated in FIG. 3 and FIG. 4.

The display panel 3 includes a first substrate 31. The fingerprint identification sensing module 1 is arranged on the first substrate 31. For clarity purposes, only a fingerprint sensing module 1 is illustrated in FIG. 3 and FIG. 4. One skilled in the art can arrange any number of fingerprint identification sensing modules 1 on the first substrate 31 anywhere according to actual needs. For example, the display panel 3 includes a display area and a non-display area. The first substrate 31 includes a display area and a non-display area correspondingly. The fingerprint identification sensing module 1 may be arranged in the non-display area or may be arranged in the display area.

The display panel 3 further includes a display element layer 33 which is arranged on the first substrate 31 and covers the fingerprint identification sensing module 1 and a second substrate 32 arranged on the display element layer 33. The first substrate 31 and the second substrate 32 are used to form the display panel 3. In order to achieve the touching effect, the display panel 3 further includes a touch-control layer 34. The touch-control layer 34 may be arranged on a surface of the second substrate 32 facing the display element layer 33 so that the touch-control layer 34 is interposed between the display element layer 33 and the second substrate 32, as illustrated in FIG. 3. The touch-control layer 34 may be arranged on a surface of the second substrate 32 away from the display element layer 33, as illustrated in FIG. 4.

The display panel 3 may be a liquid crystal display panel or an organic light-emitting diode (OLED) display panel. When the display element layer 33 is a liquid crystal display layer, the display panel 3 is a liquid crystal display panel. When the display element layer 33 is an organic electroluminescent layer, the display panel 3 is an OLED display panel.

Hereinafter, a liquid crystal display panel is as an example in another embodiment.

The display panel 3 is a liquid crystal display panel. The first substrate 31 is an array substrate. The second substrate 32 is a color filter substrate. The display element layer 33 is a liquid crystal display layer. The display panel 3 further includes a first polarizing film 35 and a second polarizing film 36, as illustrated in FIG. 3 and FIG. 4.

As illustrated in FIG. 3, the first polarizing film 35 is arranged on the surface of the first substrate 31 away from the display element layer 33. The second polarizing film 36 is arranged on the surface of the second substrate 32 away from the display element layer 33. In this way, the liquid crystal display panel in an in-cell mode is formed.

As illustrated in FIG. 4, the first polarizing film 35 is arranged on the surface of the first substrate 31 away from the display element layer 33. The second polarizing film 36 is arranged on the surface of the touch-control layer 34 away from the display element layer 33. In this way, the liquid crystal display panel in an on-cell mode is formed.

The display panel 3 may further include a protective layer 37 formed on the second substrate 32 and a bonding layer 38. The bonding layer 38 is configured to bond the protective layer 37.

Those skilled in the art will be appreciated that, when the display panel 3 as illustrated in FIG. 3 and FIG. 4 is an OLED display panel, the second substrate 32 is an encapsulation layer without the first polarizing film 35 and the second polarizing film 36.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

INDUSTRIAL APPLICABILITY

The subject matter or the application can be manufactured and used in the industry, meeting industrial applicability.

What is claimed is:

1. A fingerprint identification sensing module, comprising:
   a first electrode and a second electrode; the first electrode and the second electrode being arranged opposite;
   a piezoelectric material layer, interposed between the first electrode and the second electrode;
   a damping layer, arranged on a surface of the first electrode; and
   a supporting layer, wherein the first electrode is arranged on the supporting layer and supported by the supporting layer; the supporting layer comprises a resonant cavity; the first electrode in the resonant cavity is not supported by the supporting layer;
   wherein the damping layer is arranged on the surface of the first electrode facing the piezoelectric material layer so that the damping layer is interposed between the first electrode and the piezoelectric material layer.

2. The fingerprint identification sensing module of claim 1, wherein a material for the damping layer is any one of butyl rubber, acrylate rubber, nitrile rubber, silicone rubber, nitrile rubber and silicone rubber blends, polyurethane, polyvinyl chloride, and epoxy resin.

3. A fingerprint identification sensing module, comprising:
   a first electrode and a second electrode; the first electrode and the second electrode being arranged opposite;
   a piezoelectric material layer, interposed between the first electrode and the second electrode; and
   a damping layer, arranged on a surface of the first electrode, wherein the damping layer is arranged on the surface of the first electrode facing the piezoelectric material layer so that the damping layer is interposed between the first electrode and the piezoelectric material layer.

4. The fingerprint identification sensing module of claim 3, wherein the fingerprint identification sensing module further comprises a supporting layer; the first electrode is arranged on the supporting layer and supported by the supporting layer; the supporting layer comprises a resonant cavity; the first electrode in the resonant cavity is not supported by the supporting layer.

5. The fingerprint identification sensing module of claim 3, wherein a material for the damping layer is any one of butyl rubber, acrylate rubber, nitrile rubber, silicone rubber, nitrile rubber and silicone rubber blends, polyurethane, polyvinyl chloride, and epoxy resin.

6. The fingerprint identification sensing module of claim 3, wherein the piezoelectric material layer is any one of aluminum nitride (AlN), lead zirconate titanate (PZT), polyvinylidene fluoride (PVDF), and polyvinylidene fluoride-trifluoroethylene copolymer (P (VDF-TrFE)).

* * * * *